H. F. GRUBB.
AUTOMATIC SPEED CONTROL FOR MOTOR VEHICLES.
APPLICATION FILED AUG. 8, 1910.
1,040,189.
Patented Oct. 1, 1912.
2 SHEETS—SHEET 1.
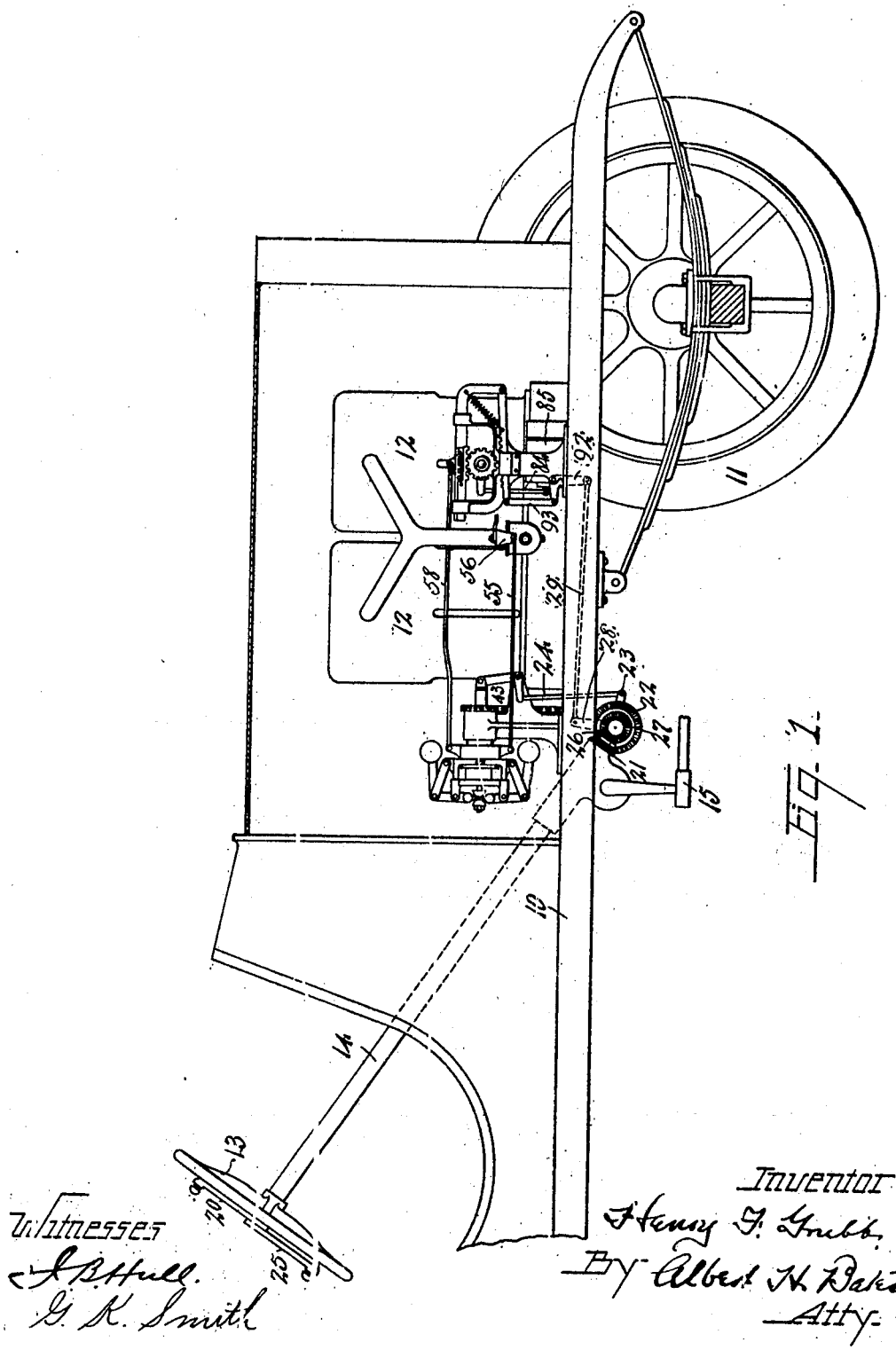

H. F. GRUBB.
AUTOMATIC SPEED CONTROL FOR MOTOR VEHICLES.
APPLICATION FILED AUG. 8, 1910.
1,040,189.
Patented Oct. 1, 1912.
2 SHEETS—SHEET 2.
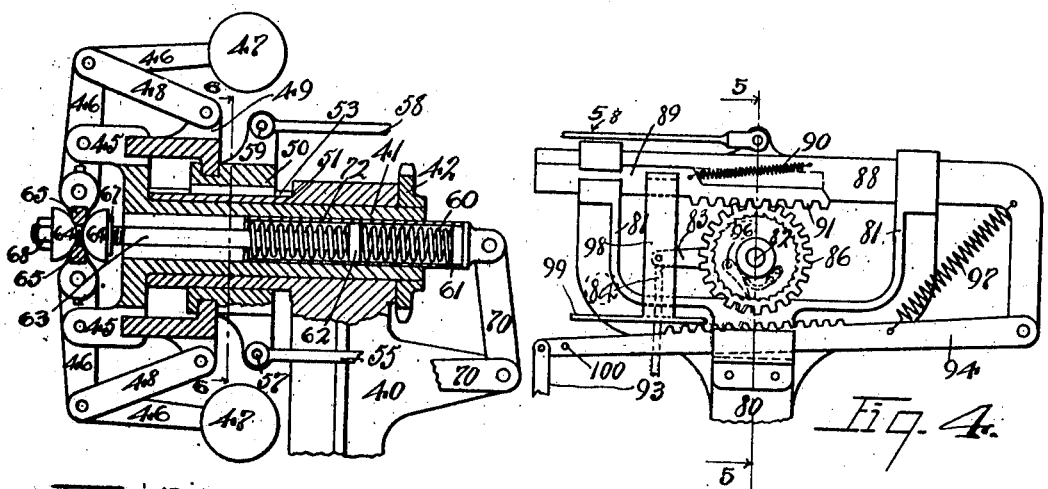
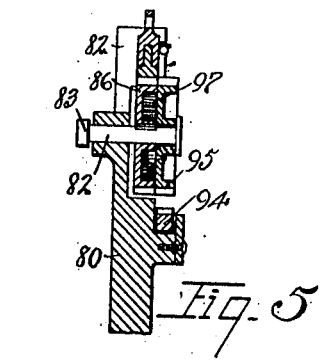
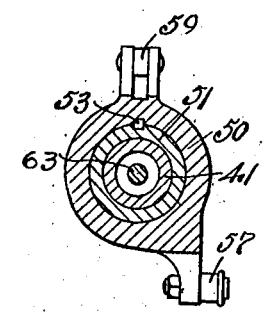
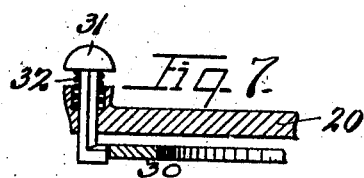
Witnesses
J. A. Hull
G. K. Smith
Inventor
Henry F. Grubb
By
Albert N. Baker
Atty.

UNITED STATES PATENT OFFICE.

HENRY F. GRUBB, OF LORAIN, OHIO.

AUTOMATIC SPEED CONTROL FOR MOTOR-VEHICLES.

1,040,189.

Specification of Letters Patent. Patented Oct. 1, 1912.

Application filed August 8, 1910. Serial No. 576,057.

*To all whom it may concern:*

Be it known that I, HENRY F. GRUBB, a citizen of the United States, residing at Lorain, in the county of Lorain and State of Ohio, have invented a certain new and useful Improvement in Automatic Speed Control for Motor-Vehicles, of which the following is a full, clear, and exact description, reference being had to the accompanying drawings.

The primary object of this invention is to provide a motor vehicle with simple and efficient mechanism for automatically controlling the speed, while allowing that speed to be set at any desired point. To this end, I have provided a governor which operates as the speed decreases to open the throttle and advance the spark, thereby causing an increase of speed. Upon such increase, the governor operates with the reverse effect, whereby the speed is maintained substantially constant. Manually operated mechanism is provided for setting the governor for any speed desired, such mechanism being readily accessible to the driver of the vehicle, as, for example, by having a handle adjacent to the steering wheel.

In addition to the above described mechanism, which is effective for maintaining the speed on a level, I provide additional manual means readily accessible for reversing the action of the governor on the spark, whereby the throttle may be automatically opened and the spark consequently retarded, thus providing the proper conditions for maximum power at low speed, as, for example, in taking a hill.

My invention comprises the means by which the above results are accomplished. Such means are illustrated in a preferred form in the drawings and are hereinafter more fully explained.

In the drawings, Figure 1 is a side elevation of the front portion of a motor vehicle equipped with my invention; Fig. 2 is a vertical longitudinal section through the governor; Fig. 3 is a view looking diagonally downward on the steering wheel in the direction of its axis; Fig. 4 is a side elevation of the mechanism controlling the spark; Fig. 5 is a vertical section through the spark controlling means, being on the plane indicated by the line 5—5 in Fig. 4; Fig. 6 is a cross section through the governor, as indicated by the line 6—6 in Fig. 2; and Fig. 7 is a section showing the locking mechanism at either of the setting handles.

As shown in Fig. 1, the numeral 10 designates the body of the vehicle provided with the usual wheels 11, engine 12, steering wheel 13 and tubular support 14 for the steering wheel. The steering wheel has a tubular shaft, not shown, within the support which operates the usual steering mechanism, indicated by 15.

20 indicates a handle for setting the governor. This handle is connected to the upper end of a tubular shaft which is within the steering shaft and carries at its lower end a pinion 21 meshing with a gear 22 with which is connected an arm 23 and a rod 24 for setting the governor, as will be hereinafter explained. Within the shaft carrying the handle 20 is another shaft carrying the handle 25. This shaft carries at its lower end a pinion 26 which meshes with a gear 27 having an arm 28 connected by a link 29 with the spark controlling mechanism. The handle 25, accordingly, is the one used for reversing the normal action of the governing mechanism for hill climbing. The two handles 20 and 25 are normally locked to a segment bar 30 (carried by the stationary tubular support 14) by means of slidable pins 31 in the respective handles which engage notches in the segment bar. A spring 32 surrounding the shank of the pin, as shown in Fig. 7, tends to maintain the handle locked, but a slight inward pressure on the knob presses the pin in sufficiently to release it from the segment bar, allowing the handle to be turned as desired.

The governor is shown in Figs. 1 and 2, and will now be described. Rotatably mounted on a pedestal 40 rising from the vehicle frame is a sleeve 41 on which is a sprocket wheel 42 connected by a sprocket chain 43 with the engine shaft, not shown. The opposite end of this sleeve 41 is formed with a pair of diametrically opposite ears 45 in which are pivoted bent levers 46 carrying on their outer ends balls or weights 47. Pivotally connected with these levers (between their pivots and weighted ends) are links 48, the inner ends of which connect with a ring 49 which has guiding extensions slidably engaging the ears 45. The ring 49 occupies an annular groove in a collar 50 slidably mounted on the outer surface of a hub 51 on the pedestal 40. This hub surrounds the sleeve 41 and forms a portion of the bearing 40. The collar, while slidable on the hub, is prevented from rotating by the spline 53 and a corresponding groove. The collar 50 is connected by a link 55 with the throttle 56, such link being pivoted to the collar by the pin 57. The collar is also connected with the spark shifting mechanism by means of the link 58 which is connected to the collar at 59.

From the construction above, described, it will be evident that, when the machine is running, the ring 49 with the weighted arms will be rotated and the balls will move outwardly by centrifugal force proportionate to the speed, and, in such outward movement, will shift the collar toward the left. This left hand shifting tends to close the throttle and to retard the spark, which causes a diminution in the speed. Now the outward movement of the balls is resisted by a spring 60 within a tubular casing 61 and compressed between the end of that casing and the head 62 on a rod 63, the outer end of the rod having a pair of hemispherical nuts 64 between which stand blocks 65 which are secured to and constitute inner extensions of the arms 46. These hemispherical nuts 64 may be adjusted in position and locked by suitable jamb nuts 67 and 68. When the speed of the engine diminishes, the spring 60 counteracts the centrifugal force and moves the balls inwardly, thereby shoving the links 55 and 58 to the right, opening the throttle and advancing the spark to increase the speed.

The link 24, heretofore referred to and operated by the handle 20, is connected with a bell crank lever 70 pivoted on the bracket 40 and connected at its upper end to the casing 61. Accordingly, the turning of the handle 20 shifts this casing in or out to increase or decrease the compression of the spring 60 and thereby determine the speed at which the governor causes a given control of the throttle and spark. Accordingly, the handle 20 sets the speed at which the engine is to run, and the governor automatically gives the proper conditions of fuel supply and spark position to maintain that speed.

To give the governor the desired sensitiveness, I mount a spring 72 between the head 62 and the inner end of the casing 61. This spring tends to retard the inward movement of the balls. When the casing 60 is shifted to the left to increase the resistance against outward movement of the balls, this same action relieves the spring 72, decreasing the resistance to inward movement. Similarly, when the casing 61 is moved toward the right to decrease the resistance to outward movement, the resistance to inward movement is correspondingly increased. A very effective control of the governor is thus obtained.

As heretofore stated, the rod 58 controls the position of the spark. In order that the action of this rod may be varied so that a movement in the right hand direction, for example, will either advance the spark when the throttle is opening, as above explained, or under special conditions, retard the spark when the throttle is opening, special mechanism is provided which is shown in Figs. 1, 4 and 5 and will now be described.

Rising from the frame is a standard 80 which, at its upper end, takes the form of a yoke 81. Journaled in this standard between the arms of the yoke is a shaft 82 which has an arm 83 connected by a link 84 with the magneto 85, or other spark control. Mounted on this shaft and keyed to it is a pinion 86. Slidably mounted in the yoke arms 81 is a bar 88 to which the rod 58 is connected. A bar 89, slidable in one of the arms 81 and having a tongue and groove connection with the bar 88, is held to that bar by a spring 90 so as normally to move in unison with it. This bar 89 has rack teeth 91 meshing with the teeth of the pinion 86. Accordingly, under normal conditions, as the bar 58 moves to the right or left, the pinion 86 and shaft 82 are correspondingly rotated and the spark is advanced or retarded.

As heretofore stated, it is desirable on occasions, to reverse the sparking effect of the governor to cause a retarding of the spark simultaneously with the opening of the throttle, for high power at low speed, and, as stated, this is accomplished by the handle 25 operating the link 29. This link 29 is connected with a bell crank 92, the other arm of which is connected by a link 93 with a rack bar 94 which is pivoted to a depending portion of the bar 88. This rack bar 94 stands below and normally free from a pinion 95 loosely journaled on the shaft 82. When, however, the handle 25 is shifted in the direction to raise the link 93, the teeth on the bar 94 come into engagement with the teeth on the pinion 95 and thereupon right hand movement, for example, of the bar 88 moves the lowermost teeth of the pinion 95 toward the right, and a pawl 96 carried by this pinion and engaging ratchet teeth 97 on an inner periphery of the pinion 86 turns the shaft 82 in the left hand direction, the bar 89 traveling idly toward the left and the spring 90 extending during such action. A spring 97 assists the raising of the bar 94. When this bar is in engagement, a left hand movement of the yoke 88, after closing any gap between the yoke and bar 91, rotates the pinion 86 and the shaft 82 in the normal retarding direction, the ratchet teeth passing idly under the pawl.

The movement described, reverses the action of the spark control from the normal when the engine slows down, but when the engine speeds up to a certain amount, the throttle is closed and the spark retarded even when the bar 94 is in engagement. Therefore, whenever the operator desires to obtain the maximum power at low speed as, for example, when taking a steep hill, he actuates the handle 25, throwing the bar 94 into engagement and reversing the sparking action of the governor, as described, and the mechanism automatically takes care of the conditions arising.

To prevent the bar 94 being thrown out of engagement when the rack 89 and yoke 88 are separated (which would disarrange the relation of the parts) I may provide mechanism illustrated in Fig. 4. As there shown this mechanism consists of a plate or bar 98 secured to rack 89 and having at its lower end a flange 99. A pin 100 on the bar 94 stands normally beneath, and forward of, this flange. When the bar 94 is down the flange moves idly, and when the bar 94 is up and the movement is in the left hand direction the flange is idle. When, however, the bar 94 is up, and the movement is in the right hand direction, the separation of the yoke 88 and rack 89 brings the flange 99 below the pin 100 and thereby prevents the bar 94 passing out of engagement with the wheel 86 until the reverse movement brings the rack 89 back to normal position.

It will be seen that the construction I have described provides an automatic speed regulation without interfering with the manual regulation by the operator. Instead, therefore, of the operator constantly shifting his throttle and sparking mechanism manually for varying conditions of running, he shifts the control of his governor, and the governor automatically maintains conditions proper for the preservation of that speed under normal running. At the same time, abnormal conditions are provided for by the other handle, which enables the operator to reverse the action of the governor on the spark mechanism.

Having thus described my invention, what I claim is:

1. The combination with a motor vehicle, of an explosive engine, a governor, means operated thereby for simultaneously controlling the throttle to open or close it and the time of the spark to advance or retard it, and means operated as desired for reversing the direction of one of said controlling operations with reference to the other.

2. The combination with a motor vehicle, of an explosive engine, a governor, means operated thereby for simultaneously controlling the throttle and the time of the spark, and means accessible to the operator for controlling the action of the governor and for reversing its action on the spark.

3. The combination with a motor vehicle having an explosive engine, of a governor adapted to act on the throttle and the sparking mechanism, manually operated means for controlling the governor, manually operated means for reversing the effect of the governor on the sparking mechanism, and a steering wheel adjacent to which said manually operated means are mounted.

4. In a motor vehicle, the combination with an explosive engine, of a governor, a sparking mechanism, means whereby the same movement of the governor may shift the sparking mechanism either to advance or to retard the spark, and means for controlling the direction of such shifting.

5. In a motor vehicle, the combination with an explosive engine, of sparking mechanism, a shaft connected therewith to advance or retard the spark according to the direction in which the shaft is turned, gear mechanism on said shaft, a pair of racks for engaging the opposite sides of said mechanism, and means for causing one rack or the other to be effective as desired.

6. In a motor vehicle, the combination with an explosive engine, a sparking mechanism, a shaft connected therewith to advance or retard the spark according to the direction in which the shaft is turned, gear mechanism on said shaft, a pair of racks to operate said mechanism, and a centrifugal governor adapted to operate said racks and also to control the throttle.

7. In a motor vehicle, the combination with an explosive engine, of sparking mechanism, a shaft connected therewith to advance or retard the spark according to the direction in which the shaft is turned, a pair of gears on said shaft, one loose and one tight, a pair of racks for engaging the opposite sides of the respective gears, and a ratchet and pawl connection between the gears.

8. In a motor vehicle, the combination with an explosive engine, of sparking mechanism, a shaft connected therewith to advance or retard the spark according to the direction in which the shaft is turned, gear mechanism on said shaft, a pair of racks for engaging the opposite sides of said mechanism, means for causing one rack or the other to be effective, as desired, a centrifugal governor adapted to operate said racks and also to control the throttle, and a pair of mechanisms accessible to the operator at the steering wheel and independently operable to vary the speeding of the governor and to determine which rack is effective.

9. In a motor vehicle, the combination with an explosive engine, of a governor for controlling the throttle and the spark, mechanism for varying the speeding of the governor, mechanism for varying the direction of spark shifting by a given governor action, a steering wheel having a tubular shaft, and a pair of shafts therein having operating handles adjacent to the wheel and connected at their lower ends with said two mechanism, respectively.

In testimony whereof, I hereunto affix my signature in the presence of two witnesses.

HENRY F. GRUBB.

Witnesses:
  ALBERT H. BATES,
  J. B. HULL.